United States Patent [19]

Krude

[11] 4,112,709
[45] Sep. 12, 1978

[54] DOUBLE UNIVERSAL JOINT

[75] Inventor: Werner Krude, Neunkirchen, Fed. Rep. of Germany

[73] Assignee: Uni-Cardan AG, Lohmar, Rheinland, Fed. Rep. of Germany

[21] Appl. No.: 726,120

[22] Filed: Sep. 24, 1976

[30] Foreign Application Priority Data

Sep. 25, 1975 [DE] Fed. Rep. of Germany ....... 2542736

[51] Int. Cl.² ............................................. F16D 3/30
[52] U.S. Cl. ......................................... 64/21; 64/2 P; 64/8
[58] Field of Search ..................... 64/21, 8, 17 R, 2 P

[56] References Cited

U.S. PATENT DOCUMENTS

| 2,947,158 | 7/1959 | King | 64/21 |
| 2,981,084 | 4/1961 | Glover | 64/17 R |
| 2,988,904 | 9/1959 | Mazzlotti | 64/21 |
| 3,120,746 | 2/1964 | Kayser | 64/21 |
| 3,470,712 | 10/1969 | Giesthoff | 64/21 |
| 3,857,256 | 12/1974 | Girguis | 64/21 |

FOREIGN PATENT DOCUMENTS

| 814,420 | 12/1936 | France | 64/21 |
| 768,065 | 5/1934 | France | 64/21 |
| 846,797 | 6/1939 | France | 64/21 |
| 773,141 | 8/1934 | France | 64/21 |
| 638,698 | 2/1928 | France | 64/21 |

Primary Examiner—Benjamin W. Wyche
Assistant Examiner—R. C. Turner
Attorney, Agent, or Firm—Edmund M. Jaskiewicz

[57] ABSTRACT

A double universal joint comprises two individual universal joints and a member positioned axially between the individual universal joints is connected to the first members of each joint. A centering plate extends perpendicularly to the axis of rotation of the connecting member and is guided for sliding movement in its own plane. The centering plate is disposed within a casing having guide surfaces for guiding the spherical outer surfaces of the second joint members of the individual universal joints. The centers of curvature of the outer spherical surfaces are offset equal distances from the centers of the respective individual universal joints when the joint is in its straight or unbent position.

6 Claims, 6 Drawing Figures

DOUBLE UNIVERSAL JOINT

The present invention relates to a double universal joint having two individual universal joints which are centered, more particularly, to the structure for centering the individual universal joints.

One form of a constant velocity double universal joint comprises two individual universal joints having a centering plate positioned axially between the two individual joints for centering the joints during bending of the double joint. Each of the individual universal joints is bent through one-half of the total bending angle of the double universal joint.

A disadvantage of such a double universal joint is that the centering plate which guides the individual universal joints can be assembled only if the outer casing is split so as to be divided or separated. Another disadvantage is that the ball pins are subject to heavy wear since the ball pins cannot be permanently lubricated and the ball pins have relatively long lever arms. Merely increasing the diameter of the ball pins will not compensate for this heavy wear. If the length of the lever arm, which is the distance from the trunnion to the ball pin, is increased in order to improve load distribution, the rotation diameter for the outer casing will also be increased since the centering plate must cover greater distances. In order to achieve proper lubrication of all of those components which require lubrication, such as the trunnions, these components must all be provided with grease fittings. However, those components which are subjected to maximum load stresses, such as the centering plate and the ball pins, are also exposed to detrimental environmental influences such as water, dust and dirt and thus cannot be permanently lubricated since the lubricant will readily escape through openings.

It is therefore the principal object of the present invention to provide a novel and improved constant velocity double universal joint.

It is another object of the present invention to provide such a joint having centering of the individual joints and which has a small rotation diameter such as to produce favorable load conditions for the components of the joint.

It is a further object of the present invention to provide such a joint wherein all components which are subject to wear are adequately lubricated by a central lubricating system.

It is an additional object of the present invention to provide such a centered double universal joint which can be readily adapted for various types of joints and can be assembled by relatively simple assembly methods.

According to one aspect of the present invention a constant speed double universal joint may comprise a pair of individual universal joints each of which has first and second joint members. Each of the second joint members has a spherical outer surface. A centering plate is positioned axially between the individual universal joints and is connected to the first members of each joint. A casing has guide surfaces thereon to guide the spherical outer surfaces of the second joint members and there are means within the casing for guiding the centering plate in movement perpendicular to the axis of rotation of the universal joint. The centers of curvature of the spherical surfaces are offset equal distances from the centers of the respective universal joints when the joint is in its unbent or straight position.

The centering plate is thus connected on each side thereof with one member of the individual universal joints and is guided with respect to those joints within a sleeve-like casing extending perpendicularly to its axis of rotation.

The double universal joint of the present invention is advantageous in that the centering plate is retained in position by a one piece outer casing or a housing without the necessity for providing an expensive flanged connection. Direction control of the joint is accomplished by the outer joint members of the individual universal joints such that the control forces are absorbed more favorably and better support for all of the components is provided. By providing identical outer casings, the invention can be readily applied to universal joints, parallel joints or ball-and-socket joints all of which are controlled by outer spherical surfaces. Central lubrication is provided by sealing of the interior space within the casing along the exterior spherical surfaces by ring seals, protective flexible bellows or similar devices.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
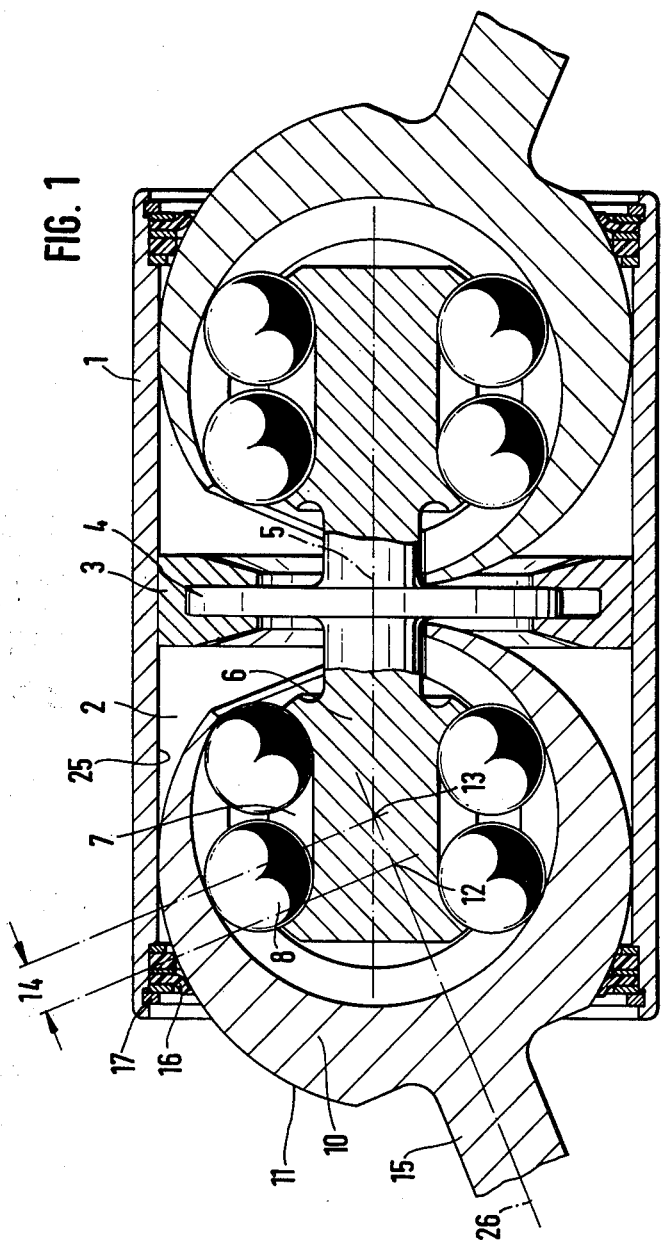
FIG. 1 is a longitudinal sectional view of a double universal joint according to the present invention having two ball-and-socket joints and sealed by sealing rings.

In FIG. 1 there is illustrated a double joint having an outer tubular sleeve-like casing or housing 1 having an interior space or cavity 2 in which is provided an axially split or divided ring 3 having at least two segments and having an annular groove in its inner surface in which is slidably mounted a centering plate 4. The plate 4 is guided by the grooved ring 3 in movement in a direction perpendicular to the axis of rotation 5 of the double joint.

The centering plate 4 is positioned axially between two individual ball-and-socket joints each having an inner joint member 6 connected in the axial direction to one side of the centering plate 4. The outer surface of the inner joint member 6 is provided with a plurality of substantially axially extending grooves 7 for receiving torque transmitting balls 8 which are also jointly received in grooves 9 formed in the inner surface of an outer joint member 10. The outer joint member 10 has a spherical outer surface 11 having a center of curvature at 12. The center of curvature 12 is offset from the center of the joint 13 by the distance indicated at 14.

The spherical outer surface 11 of the outer joint member 10 is guided along a guide surface 25 on the inner face of the casing 1 and functions as an offset direction control device in view of the offset relationship of the centers 12 and 13.

When the joint as shown in FIG. 1 is bent from its straight line position to a position such as illustrated in FIG. 1, the spherical outer surface 11 of the outer joint member 10 functions as an eccentric or cam to urge the inner joint member 6 in the radial direction. The centering plate 4 will permit only the parallel sliding displacement of the rotation axis 5 so that the other individual universal joint will be forced to bend at the same angle as the first individual joint.

The outer joint member 10 is connected to a drive shaft 15 and the outer spherical surface 11 of the outer joint member 10 is protected by a sealing ring or oil seal 16 fitted in an annular groove in the casing 1 and retained in position by a snap ring or similar fitting ring 17. Since this arrangement provides for complete sealing of the interior 2 of the joint all components of the joint which may be subject to wear are adequately supplied with lubricant. In addition, the joint of FIG. 1 can be readily and simply assembled since after the individual ball-and-socket joints have been assembled and the grooved ring has been inserted in position, this entire assembly can be inserted into the casing 1 and then sealed by the rings 16 which are secured in position by retaining rings 17.

Figure 2:
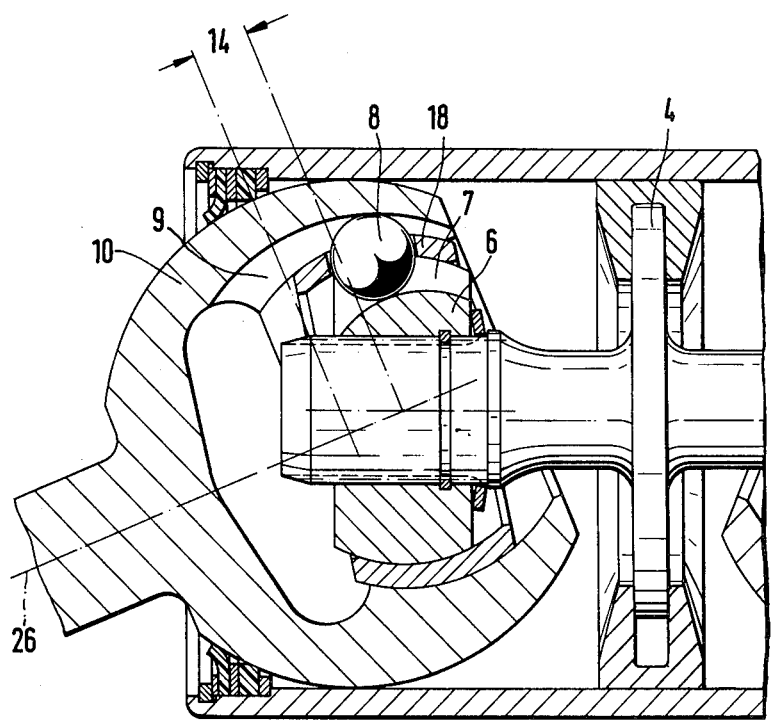
FIG. 2 is a portion of a view similar to that of FIG. 1 wherein the present invention is applied to two constant velocity torque transmitting joints.
Figure 3:
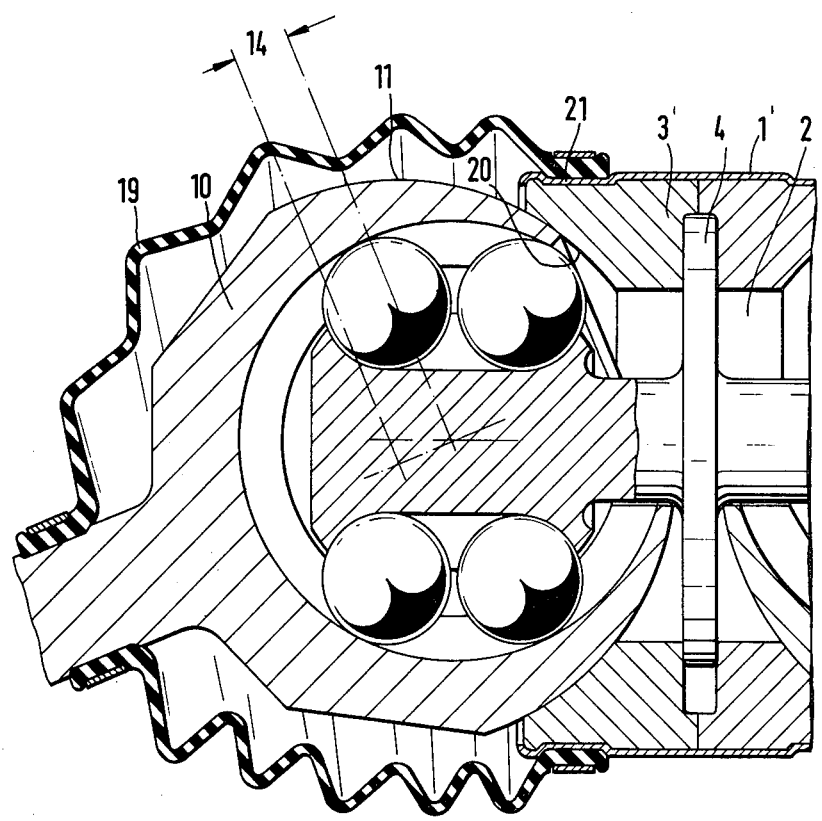
FIG. 3 is a view similar to that of FIG. 2 but showing a ball-and-socket joint enclosed with a flexible sealing boot.

In FIG. 2, each individual universal joint of the double joint comprises constant velocity torque transmission joints instead of the ball-and-socket joints illustrated in FIG. 1. In each individual joint of FIG. 2, the balls 8 are guided in a groove 7 of the inner joint member 6 and in a corresponding opposed groove 9 in the outer joint member 10. A cage 18 positioned between the inner and outer joint members retains the balls 8 in a plane which bisects the bending angle of the joint. The axis of rotation of the individual universal joint shown in FIG. 2 is indicated at 26.

in FIG. 3, the double universal joint comprises individual ball-and-socket joints as shown in FIG. 1 but a flexible boot 19 is provided to seal the inner cavity 2 of the casing 1'. In this modification, the casing 1' is considerably shorter than the casing 1 of FIGS. 1 and 2 and the split grooved ring 3' in addition to guiding the centering plate 4 is provided with surfaces 20 for guiding the spherical outer surfaces 11 of the outer joint members 10. The two portions of the split groove ring 3' are axially secured to each other by interengaging formations or indentations 21 of the casing 1' and parts of the ring 3'.

Figure 4:
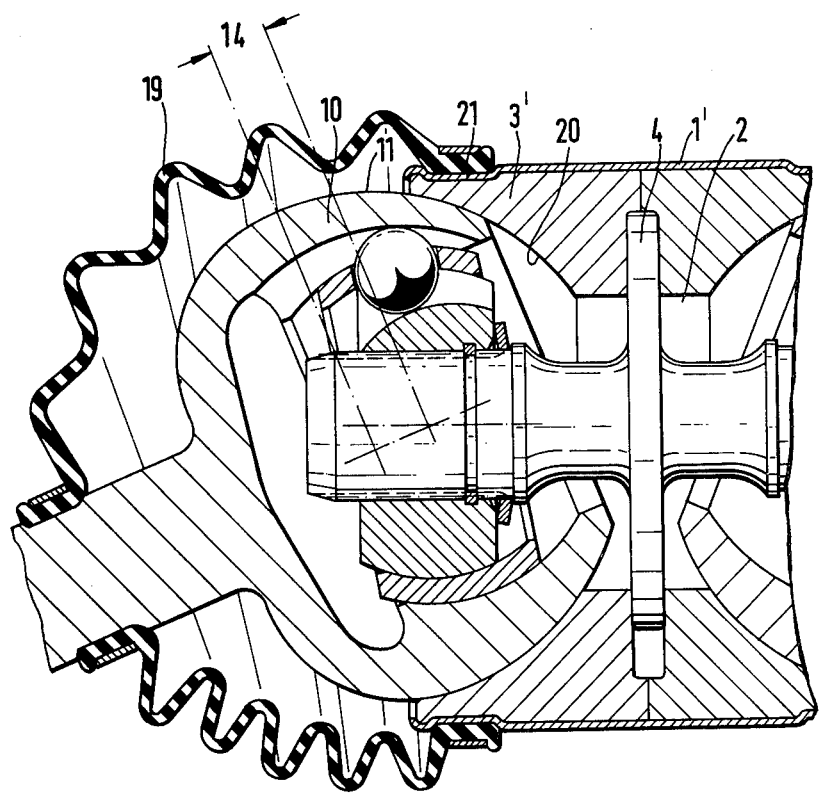
FIG. 4 is a view similar to that of FIG. 3 wherein a constant velocity torque transmitting joint is sealed by a flexible boot.

In FIG. 4, the flexible protective boot 19 for sealing both ends of the casing 1' is utilized in conjunction with a constant velocity universal joint as previously described with respect to FIG. 2.

Figure 5:
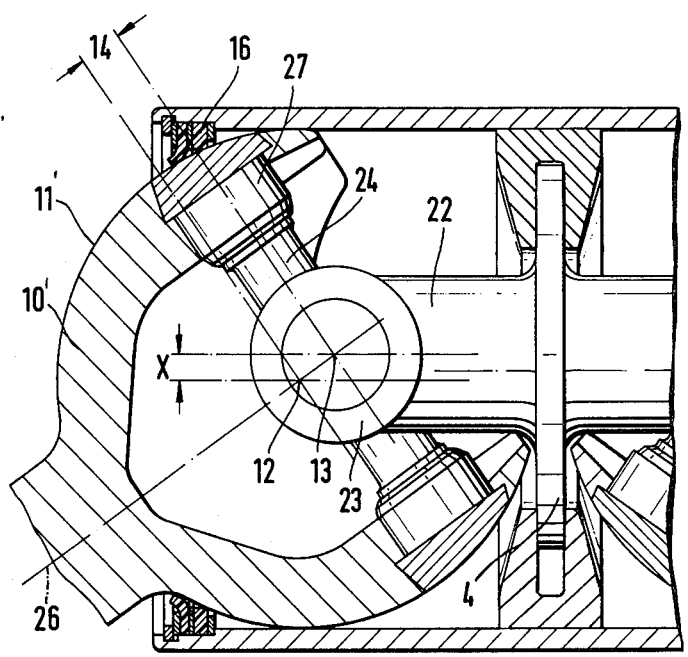
FIG. 5 is a view similar to that of FIG. 2 but wherein the individual joints are universal joints.

In FIG. 5, the individual joints are cruciform universal joints where in each side of the centering plate 4 is constructed as a double yoke 22 having a yoke arm 23 in which are received a pair of opposed pins of a cruciform trunnion 24 which transmits driving torque. The remaining opposed pins 27 are mounted in bores formed in the outer joint member 10' which is also in the form of a yoke arm. The outer joint member 10' is provided with a partial spherical outer surface 11' which is guided on the inner surface 25 of the casing 1. In such a universal joint, direction control is obtained by the offsetting of the center of curvature 12 of the spherical outer surface 11 from the center of the joint 13 by a distance indicated at 14. The other individual joint which is not illustrated has the same offet relationship.

Figure 6:
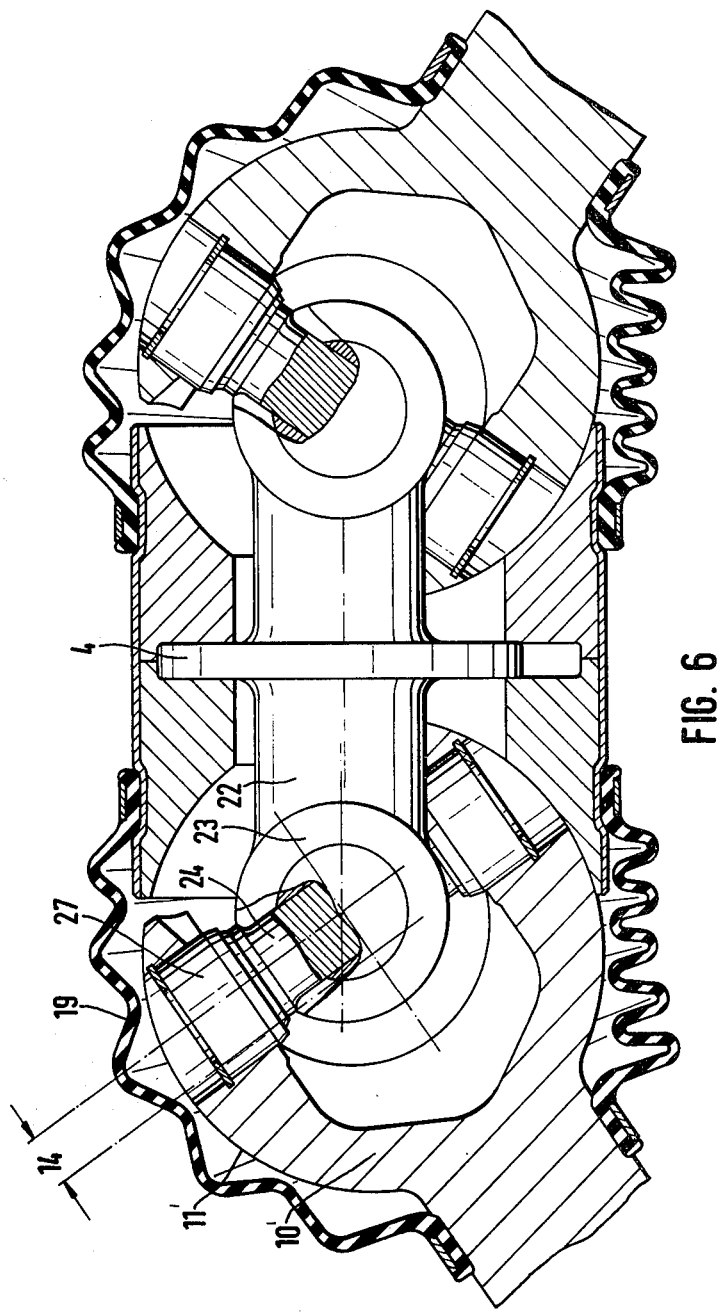
FIG. 6 is a view similar to that of FIG. 1 wherein the individual universal joints are sealed by flexible sealing boots.

FIG. 6 shows the individual cruciform universal joints of FIG. 5 employed with the flexible protective boots 19 previously described with respect to FIGS. 3 and 4.

Thus it can be seen that according to the present invention two sides of the centering plate are connected respectively with the inner joint members of a pair of ball-and-socket joints wherein the outer joint members have spherical outer faces and both the inner and outer joint members are provided with grooves which jointly receive torque transmitting balls. Also in accordance with the present invention the centering plate is in the form of a double yoke wherein each yoke receives two of the pins of a cruciform universal joint member and outer spherical surfaces are provided on the outer yoke members of the joints which receive the respective other pair of pins. It is further apparent that the invention is not limited to any specific type of joint but may be applied to various types of joints wherein the outer surfaces of the individual joints include a guide surface for control purposes.

It will be understood that this invention is susceptible to modification in order to adapt it to different usages and conditions, and accordingly, it is desired to comprehend such modifications within this invention as may fall within the scope of appended claims.

What is claimed is:

1. A double universal joint comprising a pair of individual universal joints each having first and second joint members, said second joint members each having a spherical outer surface, a centering plate positioned axially between said individual universal joints and movable perpendicular to the axis of rotation of the joint, said centering plate connected to the first members of each joint, a casing having guide surfaces thereon to guide the spherical outer surfaces of said second joint members, means within said casing for guiding said centering plate in movement perpendicular to the axis of rotation of the double universal joint, the centers of curvature of said spherical surfaces being offset equal distances from the centers of the respective individual universal joints when the joint is in its unbent position.

2. A double universal joint as claimed in claim 1 wherein said first and second joint members comprise inner and outer joint members respectively, said centering plate having opposed faces respectively connected to said inner joint members.

3. A double universal joint as claimed in claim 1 wherein said first and second joint members comprise inner and outer joint members respectively, said inner and outer joint members having opposed faces in which are provided opposed pairs of grooves, and torque-transmitting balls in said opposed pairs of grooves.

4. A double universal joint as claimed in claim 1 wherein said centering plate comprises a pair of yokes on opposite faces thereof, said first joint members comprising cruciform trunnions each having a first pair of pins pivotally mounted in a yoke of said pair of yokes, said trunnions each having a second pair of pins pivotally mounted in said second joint members.

5. A double universal joint as claimed in claim 4 wherein said second joint members each comprise a second yoke.

6. A double universal joint as claimed in claim 1 wherein said plate guiding means comprises an axially divided annular member having at least two segments.

* * * * *